United States Patent
Spooner et al.

(10) Patent No.: US 12,403,635 B2
(45) Date of Patent: Sep. 2, 2025

(54) MATERIALS AND METHODS

(71) Applicant: QinetiQ Limited, Farnborough (GB)

(72) Inventors: Christopher Douglas James Spooner, Bracknell (GB); Robert Nathan Williams, Farnborough (GB); Emma Jane Newton, Farnborough (GB); Richard Webster, Shrewsbury (GB); Graham Webster, Shrewsbury (GB)

(73) Assignee: QINETIQ LIMITED, Hampshire (GB)

( * ) Notice: Subject to any disclaimer, the term of this patent is extended or adjusted under 35 U.S.C. 154(b) by 55 days.

(21) Appl. No.: 17/630,788

(22) PCT Filed: Jul. 28, 2020

(86) PCT No.: PCT/EP2020/071178
§ 371 (c)(1),
(2) Date: Jan. 27, 2022

(87) PCT Pub. No.: WO2021/023557
PCT Pub. Date: Feb. 11, 2021

(65) Prior Publication Data
US 2022/0266484 A1    Aug. 25, 2022

(30) Foreign Application Priority Data
Aug. 5, 2019  (GB) ................................. 1911141

(51) Int. Cl.
*B29C 44/00* (2006.01)
*B29C 44/06* (2006.01)
(Continued)

(52) U.S. Cl.
CPC ........ *B29C 44/005* (2013.01); *B29C 44/3403* (2013.01); *B29C 44/348* (2013.01);
(Continued)

(58) Field of Classification Search
CPC .................................................. B29C 44/585
See application file for complete search history.

(56) References Cited

U.S. PATENT DOCUMENTS 4,031,176 A *  6/1977  Molbert ................. B29C 33/68
                                                264/DIG. 83
4,207,049 A *  6/1980  Malo ................... B29C 45/1679
                                                425/130
(Continued)

FOREIGN PATENT DOCUMENTS

DE   2348006 C2 *  9/1973  ........... B29C 44/105
EP   1174458 A1    1/2002
(Continued)

OTHER PUBLICATIONS

All About Plastics—Polyurethane (PU) and Thermoplastic Polyurethane (TPU). web.archive.org/web/20181226213513/https://www.tudosobreplasticos.com/en/materiais/pu.asp. (Year: 2018).*
(Continued)

*Primary Examiner* — Alison L Hindenlang
*Assistant Examiner* — Andres E. Behrens, Jr.
(74) *Attorney, Agent, or Firm* — MCDONNELL BOEHNEN HULBERT & BERGHOFF LLP (57) ABSTRACT

A method of forming a shaped foamed polymer article and articles obtained from said method.

12 Claims, 6 Drawing Sheets (51) Int. Cl.
  *B29C 44/34* (2006.01)
  *B29C 44/42* (2006.01)
  *B29C 44/58* (2006.01)
  *B29K 23/00* (2006.01)

(52) U.S. Cl.
  CPC ............ *B29C 44/42* (2013.01); *B29C 44/585* (2013.01); *B29K 2023/065* (2013.01)

(56) References Cited

U.S. PATENT DOCUMENTS

| | | | | |
|---|---|---|---|---|
| 4,906,672 | A * | 3/1990 | Stone | C08J 9/122 264/50 |
| 5,711,905 | A * | 1/1998 | Behl | B29C 44/3426 264/102 |
| 6,103,152 | A * | 8/2000 | Gehlsen | B29C 44/18 428/313.5 |
| 6,129,870 | A * | 10/2000 | Hettinga | B29C 44/0415 264/40.5 |
| 7,763,676 | B2 * | 7/2010 | Moncla | C08J 7/043 524/576 |
| 7,981,332 | B2 * | 7/2011 | Gruber | B29C 43/146 264/102 |
| 2002/0017734 | A1 * | 2/2002 | Sugihara | B29D 35/148 521/82 |
| 2002/0168509 | A1 * | 11/2002 | DeSimone | B32B 27/08 428/318.6 |
| 2003/0158275 | A1 * | 8/2003 | McClelland | C08J 9/0023 521/50 |
| 2009/0184436 | A1 * | 7/2009 | Gruber | B29C 45/561 425/149 |
| 2010/0326994 | A1 * | 12/2010 | Ichikawa | B65D 81/38 220/675 |
| 2013/0101826 | A1 * | 4/2013 | Haug | C08J 9/32 521/76 |
| 2015/0087733 | A1 * | 3/2015 | Heusser | B29C 48/385 521/79 |
| 2015/0197615 | A1 * | 7/2015 | Blumsom | C08J 9/224 521/54 |
| 2016/0311140 | A1 * | 10/2016 | Stigsson | B29C 44/585 |
| 2016/0346985 | A1 * | 12/2016 | Heusser | B29B 7/325 |
| 2019/0152099 | A1 * | 5/2019 | Beard | B29C 49/04 |
| 2019/0263033 | A1 * | 8/2019 | Walia | B29C 37/0032 |
| 2020/0094440 | A1 * | 3/2020 | Lee | C08J 9/0023 |
| 2020/0094452 | A1 * | 3/2020 | Baghdadi | B29C 45/1816 |
| 2022/0002511 | A1 * | 1/2022 | Minnich | C08J 9/06 |

FOREIGN PATENT DOCUMENTS

| | | | | |
|---|---|---|---|---|
| GB | 1442766 | A * | 7/1976 | ........... B29C 44/105 |
| GB | 2518883 | | * 10/2013 | |
| GB | 2518883 | A | 4/2015 | |
| WO | WO-2017214099 | A1 * | 12/2017 | ......... B29C 37/0032 |

OTHER PUBLICATIONS

Foaming Agent—Wikipedia. web.archive.org/web/20180914190827/ https://en.wikipedia.org/wiki/Foaming_agent. (Year: 2018).*
Jin, Fan-Long, et al. "Recent Trends of Foaming in Polymer Processing: A Review." Polymers, vol. 11, No. 6, Multidisciplinary Digital Publishing Institute, Jun. 2019, p. 953. https://doi.org/10.3390/polym11060953. (Year: 2019).*
DE2348006-C2 (Michajlov) Sep. 1973 (online machine translation), [Retrieved on Mar. 25, 2024]. Retrieved from: Google (Year: 1973).*
International Searching Authority, International Search Report and Written Opinion mailed on Oct. 21, 2020, issued in connection with International Patent Application No. PCT/EP2020/071178, filed on Jul. 28, 2020, 9 pages.
Lichtenecker et al., "Die Herleitung des logarithmischen Mischungegesetzes aus allgemeinen Prinzipien der stationaren Stromung," Phys. Zeitsch,, 1931, pp. 255-260, vol. 32 (+English translation).
Lichtenecker et al., "Mischkorpertheori als Wahrscheinlichkeitsproblem," Phys. Zeitsch, 1929, pp. 805-809, vol. 30, (+English translation).

* cited by examiner

MATERIALS AND METHODS

The present application is a national stage entry of PCT/EP2020/071178 filed on Jul. 28, 2020, which claims priority to Great Britain Patent Application No. 1911141.8 filed Aug. 5, 2019, the contents of each of which are hereby incorporated by reference.

FIELD OF THE INVENTION

The present invention relates to a method for forming shaped articles. More specifically, the present invention relates to a method for forming shaped articles wherein the article is in the form of a foamed polymer and wherein at least some of the properties of the polymer are non-variant or substantially non-variant across the entire, or across substantially the entire, volume of the shaped foamed polymer. The present invention also relates to shaped articles obtainable from said methods.

BACKGROUND OF THE INVENTION

Polymer foams are used in a wide variety of applications such as packaging and insulation. Polymer foams are made up of a solid and gas phase mixed together to form a foam. The resulting foam has a polymer matrix with voids, for example air bubbles and/or air tunnels, incorporated in it. These may be referred to as closed cell or open cell structures depending on the arrangement of the voids. The gas that is used in the foam is termed a blowing or foaming agent and may be chemical or physical in nature. Physical blowing agents are gases that do not react chemically with the foaming process and are therefore inert to the polymer forming the matrix. Chemical blowing agents are chemicals that take part in a reaction or decompose giving off chemicals in the process.

Polymers may be filled with filler materials (e.g. particulate or fibrous) in order to tailor the properties of the polymer or simply in an attempt to use filler material in order to save on the use of polymer which tends to be more expensive than filler material. In these circumstances, it is desirable if the filled polymer exhibits at least broadly comparable properties to the unfilled polymer and preferably improved properties.

It can be difficult to provide a foamed shaped polymer wherein at least some of the properties of the polymer are non-variant or substantially non-variant across the entire, or across substantially the entire, volume of a (filled) foamed polymer. This may particularly be the case when the polymer is processed during certain additive techniques such as injection moulding, as opposed to subtractive techniques such as machining shapes from a larger sheet of foam which has significantly higher cost implications.

Materials which possess consistent properties across their entire volume or across substantially their entire volume may be required when used in Radio Frequency (RF) products. RF products are generally taken to mean devices or products which operate in the radio wave region of the electromagnetic spectrum, with wavelengths longer than infrared light. They have frequencies from about 3 kHz to about 300 GHz, and corresponding free space wavelengths from about 100 km to about 1 mm. More recently the terahertz frequency domain is being used. Terahertz is typically defined as the frequency range of 100 GHz to 30 THz with corresponding free space wavelengths of 3 mm to 0.01 mm. Particular types of lens may also operate within this range of the spectrum. Examples of RF products include multilayer products such as radomes, RF lenses (e.g. a Luneburg lens), retro-reflectors, RF waveguides, RF filters, RF resonators, metamaterial structures, refraction structures, diffraction structures, or scattering structures.

More specifically, some applications may require the dielectric constant (or permittivity) to be non-variant throughout (or across the volume of) an article or part thereof. For example, in some applications it may be required that the permittivity is non-variant, as changes to the permittivity can give rise to changes in the associated RF properties. In a multilayer structure, it may be desirable to achieve this non-variance across all of the layers, some of or more than one of the layers, at least one of the layers, or just one of the layers. Other properties which may be required to be non-variant include permeability, thermal conductivity, density, porosity, or coefficient of thermal expansion.

The present inventors are not aware of polymers that currently exist which possess an intrinsic dielectric constant (dk), (or real relative permittivity), of less than 2.0 and, optionally, a low loss tangent (e.g. <0.002).

Further, there is a need to be able to make materials or products with certain properties, including those discussed above, using cost effective techniques which allow for high throughput. Examples of such products include the aforementioned RF products, shaped products in general, multilayer products, lens structures and the like. Injection moulding is a relatively low cost scalable technique for making the various parts of a product, including products for which the requirements are quite stringent. Blowing or foaming agents have been used in connection with injection moulding to make foamed polymers and typically a chemical blowing or foaming agent is used such as azodicarbamide ($H_2NC(O)N=NC(O)NH_2$). The blowing agent decomposes on account of the heat associated with the injection moulding technique to produce a gas such as nitrogen, carbon monoxide, carbon dioxide, ammonia, and/or water which will dissolve into the polymer during the injection moulding process, (typically at the high pressures the polymer is subject to at the barrel compression stage of the injection moulding process). The gas and/or water then expand when the polymer is injected into the low or lower pressure of the mould cavity giving rise to voids which solidify to form a foamed polymer. The voids are typically spherical in shape or essentially spherical.

However, there are a number of disadvantages associated with such a technique. For example, a product or shaped article or part thereof formed using injection moulding will typically possess a thick skin of solid polymer at the surface of the mould tool, i.e. a volume of polymer with no voids present or significantly fewer voids when compared with the rest of the polymer. The presence of such a skin may potentially be advantageous in some applications, however this is not the case for all applications. The presence of the polymer skin means that areas of the polymer will possess a higher density which can, for example, result in a significant variance of properties, such as permittivity, across the volume of the polymer. The present inventors have identified that, inter alia, it would be beneficial to be able to make injection mouldable material in order to facilitate the economical manufacture of shaped articles or parts thereof which possess a dk of less than 2.0, for example about 1.5 or less and with a loss tangent of <0.002 across the entirety thereof. The present inventors have also found that for a target dk of around 1.5 a volume fraction of polymer and air of about 40 to 60 vol % would be beneficial which equates to a (filled) foam density of about 300 g/L to about 500 g/L (including for lower density polymers such as the polyolefins). Existing foams made using low cost shaped moulding processes typically possess densities significantly outside of this range. Densities in this range are commercially available in sheet stock, which can be machined to shape. However, this subtractive process is typically costly, leaves a significant porous friable surface prone to contamination in service, plus sheet stock materials are typically made from thermosetting polymer which have loss tangents higher than the <0.002 required. Reference may be made to the volumetric mixture laws such as those described by Lickteneker et al in K. Lichtenecker: Mischkorpertheori als Wahrscheinlichkeitsproblem. Phys. Zeitsch. Vol. 30, 1929: 805-809, and K. Lichtenecker and K. Rother: Die Herleitung des logarithmischen Mischungegesetzes aus allgemeinen Prinzipien der stationaren Stromung. Phys. Zeitsch, vol. 32, 1938: 255-260 the contents of both of which are hereby incorporated by reference in their entirety.

SUMMARY OF THE INVENTION

In order to address at least some of the afore-mentioned problems, it is an object of the present invention to provide a method of forming a shaped article which comprises (or consists of) a foamed polymer, wherein the foamed polymer comprises a number of voids which are distributed across the entirety of the polymer. The method in accordance with the invention provides shaped articles comprising or consisting of foamed polymer wherein the polymer does not comprise a polymer skin, i.e. the voids are distributed throughout the entirety of the polymer. In addition, the present invention seeks to provide a method of forming a shaped foamed polymer article wherein one or more properties are non-variant throughout the volume of the article in its entirety, or of a part making up the article which can be identified as a constituent and a distinct part (for example, one layer in a multilayer structure of said article). Such a property may be the dielectric constant or complex permittivity or more specifically the relative real permittivity. By non-variant it may be taken to mean that the mean value of the property in question (e.g. permittivity) may vary between a range of 0 to 5% over a volume scale suitable to take the mean of said property (i.e. ≥one tenth of wavelength scale, or a large enough number of void cells), including all values in between 0% and 5%, preferably up to 2% or up to or less than 0.5%). Preferably, the property does not vary (i.e. by 0%) at any point where the article or part thereof is measured compared to any other point on the article or part thereof.

As such, and in a first aspect, the present invention provides a method of forming a shaped foamed polymer article in an injection moulding tool from a polymer composition, said polymer composition comprising a polymer and a foaming agent, wherein the injection moulding tool comprises:

a cavity in which said article is formed;
a tool part which is movable to vary the volume of said cavity; and wherein the method comprises:
(a) moving the tool part so that the cavity volume is greater than twice the volume of the shaped foamed polymer article in its final form;
(b) reducing the pressure in the cavity;
(c) injecting the polymer composition into the cavity, wherein the volume of the injected polymer composition is less than the volume of the shaped foamed polymer article in its final form;
(d) sealing the cavity;
(e) moving the tool part to reduce the volume of the cavity to correspond to the geometry volume of the shaped foamed polymer article in its final form.

Following the completed formation of the shaped article it may be cooled, for example to room temperature (e.g. about 20° C.). In the first aspect of the invention, (a)-(e) may be referred to herein as steps (a)-(e) and the steps may be performed in the specified sequence. The method may comprise or consist of steps (a)-(e). The cooling may be referred to as step (f).

In a second aspect, there is provided a shaped foamed polymer article obtainable from a method in accordance with the first aspect of the present invention. The shaped foamed polymer article comprises or consists of a foamed polymer. The shaped foamed polymer article may be characterised by the absence of a polymer skin. A polymer skin is a part of the foamed polymer which does not comprise any voids or significantly fewer voids when compared to the rest of the shaped foamed polymer article and is located on at least one surface of the polymer article. This absence of a polymer skin provides a foamed polymer where the variance of one or more properties across the entire volume of the foamed polymer is decreased when compared with conventional foamed polymers not made in accordance with the present invention. By non-variant it may be taken to mean that the property (e.g. permittivity) does not vary (i.e. by about 0% to about 5%, or up to about 2%, or up to or less than 0.5%) at any point where the article or part thereof is measured compared to any other point on the article or part thereof. The property may be non variant on account of the density of the article or part thereof not varying. The shaped foamed polymer article in accordance with the present invention, or a part thereof, may possess an intrinsic dielectric constant (dk), (or real relative permittivity), of less than about 2.0 (for example about 1.5) and, optionally, a low loss tangent of less than about 0.002.

For ease of reference, the polymer referred to in the various aspects of the invention may be referred to herein as the host polymer. Also for ease of reference, the shaped foamed polymer article may be referred to herein as the shaped article or the finished shaped article as appropriate.

The shaped article made in accordance with the present invention is formed in an injection moulding technique. The cavity may be referred to herein as a shaped tool cavity or a mould cavity or tool cavity. The tool cavity may comprise a moving part or moving tool part such as a movable plate or movable back plate. By moving the tool part the volume of the cavity is adjusted, i.e. either increased or decreased as appropriate. The shaped tool cavity may be referred to herein as the cavity or tool cavity.

The polymer (or host polymer) is a thermoplastic polymer. The thermoplastic polymer may be selected from one or more of a number of polymers. Any of the polymers mentioned herein for use in the present invention may be a homopolymer or a copolymer.

The polymer may be selected from any thermoplastic polymer which is readily moulded and which has suitable melt processing temperature, suitable examples for injection moulding are; polyethylene (PE), polypropylene (PP), Acrylonitrile Butadiene Styrene (ABS), Polyoxymethylene (POM), Poly(methyl methacrylate) (PMMA), Cyclic Olefin Copolymer (COC), Cyclic Olefin Polymer (COP), Ethylene Methacrylate (EMA), Ethylene tetrafluoroethylene (ETFE), Ethylene-vinyl acetate (EVA), Fluorinated ethylene propylene (FEP), Polycarbonate (PC), Liquid Crystal Polymer (LCP), Polyamide (PA), Polyaryletherketone (PAEK), polyamide-imide (PAI), Polybutylene succinate (PBS), Polybutylene terephthalate (PBT), Polyethylene terephthalate (PET), Polyether ether ketone (PEEK), Polyethylenimine (PEI), Polyetherketone (PEK), Polyethylene naphthalate (PEN), Polysulphone (PSU), Polyimide (PI), Poly(lactic acid) (PLA), polymethylpentene (PMP), Polyphenylene Ether (PPE), Polyphenylene sulphide (PPS), Polystyrene (PS), Polyvinyl chloride (PVC), Polyvinylidene fluoride (PVDF), Styrene acrylonitrile (SAN), Thermoplastic polyurethane (TPU).

The polymer may be selected from polyolefin, for example mono-olefin polymers of ethylene, propylene, butene or the like, functionalized derivatives and physical blends and copolymers of the same. Typical examples of the polyolefin are polyethylene such as a low-density polyethylene (LDPE), linear low density polyethylene (LLDPE), medium-density polyethylene (MDPE), and high-density polyethylene (HDPE); polypropylenes such as polypropylene and ethylene-polypropylene copolymer; poly (4-methylpentene); polybutene; polyacrylate; ethylene-vinyl acetate copolymer; and mixtures thereof. The polyolefins may be obtained by polymerisation in a known way, e.g. by the use of a Ziegler catalyst, or obtained by the use of a single site catalyst such as a metallocene catalyst.

The polymer may be a copolymer or a homopolymer. The polymer may be in the form of a resin. The term resin may be taken to mean a polymer material, either solid or liquid, prior to its shaping in to the (finished) shaped article.

The polymer composition may comprise further components. For example, the polymer composition may comprise additives such as one or more flame retardants, one or more thermal stability additives, or one or more ultraviolet stabilising additives.

A blowing agent is a type of foaming agent. The blowing agent is capable of producing a cellular structure via a foaming process. The blowing agent may be selected from one or more of a number of known blowing agents, including hydrocarbons, (liquid) $CO_2$, nitrogen, isocyanate, azodicarbonamide, sodium bicarbonate.

Another example of a type of foaming or blowing agent which is preferred for use in the method of the present invention is polymers (e.g. polymer spheres or polymer shells), which encapsulate a gas or more than one gas or a liquid or more than one liquid or a mixture of gas(es) and liquid(s). Essentially, the material contained within the polymer shell may be capable of forming a gas when used as a foaming or blowing agent, e.g. when activated. These polymer spheres may be referred to herein as polymer bubbles or polymer microspheres. Polymer microspheres are commercially available and sometimes marketed as a (light weight) filler and a blowing agent in one and may also be referred to as thermoplastic microspheres. The encapsulated liquid or gas is the blowing agent and the polymer sphere (or shell) may act as a filler. The combination of the polymer sphere and encapsulated liquid or gas may also more generally be referred to herein as a blowing or foaming agent. In the method in accordance with the invention, and prior to injecting the polymer composition in (c), polymer microspheres may be incorporated (e.g. compounded) into the host polymer. Therefore, the polymer microspheres may be compounded into the host polymer prior to the formation of the shaped article in an injection moulding technique. The polymer microspheres may be activated (i.e. expanded) at the host polymer's optimum melt processing temperature thereby increasing in size and cast into the polymer as small bubbles or voids.

The polymer composition is heated to a temperature so that the polymer composition melts. The precise temperature or temperature range will be dependent largely on the particular polymer which is used. It will also be affected by the presence of the other constituents present in the polymer composition and the relative amounts thereof.

The shaped article may be made from one part, or more than one part, one layer or more than one layer. The shaped article may be multi-layered.

Advantageously, the method in accordance with the present invention provides one or more of the following: density reduction of a shaped foamed polymer article up to about 80% when compared with foamed polymers prepared in accordance with traditional techniques; a homogeneity throughout the shaped foamed article (or part thereof); elimination or reduction of the presence of a polymer skin; or the retention of a very thin layer of skin. A very thin layer of solid polymer skin is typically less than 100 μm thickness, or of the order of 1 polymer microsphere diameter in thickness. Retaining such a very thin layer of skin may be advantageous for surface friability and for protecting against contamination while at the same time possessing a minimal effect on RF frequencies and terahertz frequencies (for example, frequencies from about 3 kHz to about 300 GHz and up to 30 THz).

BRIEF DESCRIPTION OF THE DRAWINGS

This and other aspects of the present invention will now be described in more detail, with reference to the appended drawing(s) showing embodiments(s) of the invention.

DETAILED DESCRIPTION OF THE INVENTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference numerals in the drawings refer to like elements throughout.

The present inventors have found that shaped foamed polymer articles may be made using economical, high throughput techniques such as injection moulding where the foamed polymer possesses voids across its entirety. Optionally, there may be present a polymer skin which is less than 100 µm in thickness. The polymer skin is located at least on one outer surface of the foamed polymer.

Host Polymer

The host polymer is a thermoplastic polymer. The thermoplastic polymer may be selected from one or more of a number of polymers. Any of the polymers mentioned herein for use in the present invention may be a homopolymer or a copolymer.

The polymer may be selected from any thermoplastic polymer which is readily moulded and which has suitable melt processing temperature, suitable examples for injection moulding are; polyethylene (PE), polypropylene (PP), Acrylonitrile Butadiene Styrene (ABS), Polyoxymethylene (POM), Poly(methyl methacrylate) (PMMA), Cyclic Olefin Copolymer (COC), Cyclic Olefin Polymer (COP), Ethylene Methacrylate (EMA), Ethylene tetrafluoroethylene (ETFE), Ethylene-vinyl acetate (EVA), Fluorinated ethylene propylene (FEP), Polycarbonate (PC), Liquid Crystal Polymer (LCP), Polyamide (PA), Polyaryletherketone (PAEK), polyamide-imide (PAI), Polybutylene succinate (PBS), Polybutylene terephthalate (PBT), Polyethylene terephthalate (PET), Polyether ether ketone (PEEK), Polyethylenimine (PEI), Polyetherketone (PEK), Polyethylene naphthalate (PEN), Polysulphone (PSU), Polyimde (PI), Poly(lactic acid) (PLA), polymethylpentene (PMP), Polyphenylene Ether (PPE), Polyphenylene sulphide (PPS), Polystyrene (PS), Polyvinyl chloride (PVC), Polyvinylidene fluoride (PVDF), Styrene acrylonitrile (SAN), Thermoplastic polyurethane (TPU).

The host polymer may be selected from polyolefin, for example mono-olefin polymers of ethylene, propylene, butene or the like, functionalized derivatives and physical blends and copolymers of the same. Typical examples of the polyolefin are polyethylene such as a low-density polyethylene (LDPE), linear low density polyethylene (LLDPE), medium-density polyethylene (MDPE) and high-density polyethylene (HDPE); polypropylenes such as polypropylene and ethylene-polypropylene copolymer; poly (4-methylpentene); polybutene; polyacrylate; ethylene-vinyl acetate copolymer; and mixtures thereof. The polyolefins may be obtained by polymerisation in a known way, e.g. by the use of a Ziegler catalyst, or obtained by the use of a single site catalyst such as a metallocene catalyst.

The polymer may be a copolymer or a homopolymer. The polymer may be in the form of a resin. The term resin may be taken to mean a polymer material, either solid or liquid, prior to its shaping in to the shaped article.

The host polymer may be selected from one or more of polyethylene (PE) and polypropylene (PP). These polymers may be present as homopolymers or copolymers. The polymer or polymers may be present in low density or high density form. The host polymer may be selected from one or any combination of low density polyethylene (LDPE), linear low density polyethylene (LLDPE) and high density polyethylene (HDPE). The typical densities and mean molecular weight values are provided in Table 1 for these polymers.

TABLE 1

| PE type | Typical Density (g/cm$^3$) | Mean molecular weight (g/mol) |
|---|---|---|
| LDPE | 0.910-0.925 | <200,000 |
| LLDPE | 0.910-0.940 | <50,000 |
| HDPE | 0.941-0.965 | <50,000 |

The host polymer may be crosslinked after formation of the shaped article. Advantageously, cross-linking of the polymer may increase the service temperature and heat deflection temperature. By service temperature is meant the temperature at which the polymer is used in a particular application. An alternative term for service temperature is operating temperature.

Blowing or Foaming Agents

Any of the known blowing or foaming agents are suitable for use in the present invention. The blowing agent is capable of producing a cellular structure via a foaming process. The blowing agent may be selected from one or more of a number of known blowing agents, including hydrocarbons, (liquid) $CO_2$, nitrogen, isocyanate, azodicarbonamide, sodium bicarbonate.

The present inventors have found that polymer bubbles or (thermoplastic) polymer microspheres are of particular use. A thermoplastic polymer which is essentially spherical, may form a container or shell for a gas or gases or liquid(s). Above a critical onset temperature, the polymer shell softens, or more specifically its modulus reduces below a certain critical value at which the pressure of the gas or liquid within the shell causes the shell to expand to many times its original size. The polymer microsphere possesses an expansion temperature range. The polymer forming the shell may be the same type of polymer as the host polymer or it may be a different polymer. The gas contained in the polymer shell may be selected from one or more of oxygen, carbon dioxide, nitrogen, or an alkane. Examples of suitable alkanes are butane and pentane. In the present invention, pentane is preferred. Materials which are liquid at room temperature may also or alternatively be contained within the shell such as water, organic solvents and higher fraction alkanes.

The polymer microsphere may act both as a filler and a blowing agent. The polymer microsphere may be combined with other blowing or foaming agents, for example any one or combination of the blowing or foaming agents listed herein. The polymer microsphere may be combined with the host polymer, for example the polymer microsphere may be compounded in the polymer host.

The polymer shell or thermoplastic material may have a diameter of about 1 µm to about 50 µm prior to expansion, for example about 5 µm to about 20 µm, for example about 5 µm to about 10 µm. On heating, the volume may increase by a factor of about two to forty times. The polymer shell or thermoplastic material may have a wall thickness of about 0.1 µm to about 5 µm. On heating, this may decrease by a factor ranging from about five to about twenty times. Pre-expansion, the density of the polymer microspheres may be about 1000 kg/m$^3$. Post-expansion the density of the polymer microspheres may be around 5-40 kg/m$^3$. Typically, the polymer microspheres are expandable between temperatures of about 70° C. to about 250° C., for example about 80° C. to about 235° C.

The shell of the polymer microsphere may consist of or comprise one or more polymers which may be homopolymer(s) or copolymer(s). For example, the polymer shell may consist of or comprise of: an acrylonitrile, (ACN), ethylene vinylacetate (EVA), Poly(methyl methacrylate) (PMMA), Polyvinylidene chloride (PVDC), including a homopolymer thereof or a copolymer thereof. A polymer whose monomer is suitable for suspension polymerisation which has suitable melt strength and melting temperature range compatible with the processing temperature of the host polymer may be used. A thermoplastic polymer may be used which possesses a suitable melting range to match that or substantially match that of the host polymer, plus suitable melt strength and elasticity to allow the polymer shell to expand and suitable chemistry to facilitate suspension polymerisation. The polymer microsphere may be in dry or wet form. The polymer microspheres may be compounded to form a masterbatch thereof, for example in the form of pellets. The polymer into which the polymer microspheres are masterbatched may be any of the polymers referred to herein. The polymer constituting the shell of the polymer microsphere and the polymer of the masterbatch may be the same or different.

Examples of suitable commercially available filled polymer microspheres are the Expancel™ microspheres which are commercially available from Nouryon™. These thermoplastic microspheres encapsulate a gas. On heating, the gas expands and the shell softens resulting in a significant increase in volume of the microsphere. The microspheres are typically of the order of about 8-12 µm in diameter and on heating can expand up to about 40 µm in diameter. Prior to heating, the thickness of the shell may be about 2 µm and on heating this thickness may decrease to about 0.1 µm.

When polymer microspheres are used, the host polymer should preferably possess a suitably low melt viscosity in order that the resistance to the expansion of the microspheres is minimised. A low melt viscosity may be characterised by a high melt flow rate which is typically the measure of a known mass of polymer passing through an aperture of known dimensions in a given time under a constant force.

A melt flow rate for use in accordance with the present invention may be ≥20 g/10 min. In particular, such a melt flow rate when used with HDPE is preferred. Polypropylene possessing a melt flow rate of >20 g/10 min is also preferred, however higher melt flow rates are also suitable, e.g. up to about 100 g/10 min. The melt flow rate or melt flow index is measured in accordance with ISO 1133. A suitable example of a commercially available polymer is Dow 25055E HDPE or Sabic FPC100 PP.

The polymer microsphere may be selected so as to provide optimum expansion at the processing temperature of the host polymer. For example, for host polymers HDPE and PP this is typically in the range of about 200 to about 260° C. A suitable commercially available polymer microsphere is 980DU120 from Nouryon. This material possesses a particle size of 25-40 µm, a starting expansion onset temperature of 158-178° C., a maximum expansion temperature of 215-235° C., and a theoretical minimum expanded density of ≤14 kg/m$^3$. Another example of a suitable commercially available sample is Nouryon 980MB120 which is 980DU120 compounded into EVA (host) polymer, e.g. in the form of pellets.

The expansion onset temperature, or expansion onset temperature range, is when the polymer microsphere shell starts to soften so it becomes pliable enough to begin stretching. The maximum (expansion) temperature, or maximum (expansion) temperature range is the temperature at which the polymer microsphere shell begins to melt, and the melt strength decreases and the shell may burst.

The amount of foaming agent (e.g. polymer microspheres) present in the polymer composition may be about 0.5 wt % to about 10 wt % or about 3 wt % to about 7 wt % based on the total weight of the polymer composition plus any other materials present (including the foaming agent) in said polymer composition. These ranges are based on the polymer microspheres in dry powder form and not when masterbatched or compounded.

The gas encapsulated by the thermoplastic polymer shell may provide an increase in volume which is up to forty times that of the unexpanded shell when heated to the processing temperature. Organic gases may be used, including pentane. Liquids may also be used.

The polymer microspheres may be manufactured using the suspension polymerisation processing technique. In this technique, an organic phase, consisting of monomers, blowing agent, initiator and a cross-linker, is mixed with a water phase consisting of water, colloid and surfactant. Through vigorous agitation, small monomer droplets form in the water phase forming an emulsion. The polymerization reaction is then initiated by heating, transforming the monomer droplets into thermally expandable microspheres. The droplets are stabilized by the colloid, for example either flocculated silica or $Mg(OH)_2$, and a surfactant.

Compounding

The host polymer may be filled by methods in which a foaming agent (which may be referred to in this section as a filler material) and a polymer resin are mixed together in suitable ratios to form a blend (so-called "compounding").

The polymer resin may be in a form (e.g. liquid form) to enable the filler material (or foaming agent) to be dispersed therein. Where the polymer resins are solid at ambient temperatures, the polymer resin may need to be melted before the compounding can be accomplished. In some embodiments, the foaming agent may be dry blended with particles of the polymer resin.

The polymer resin, the foaming agent (e.g. polymer microspheres), and if necessary, any other optional additives (such as flame retardants), may be formed into a suitable masterbatch by the use of suitable mixing equipment in a manner known per se. Twin Archimedes screw extruders are typically used in the polymer compounding and masterbatch industry. The master batch may be pelletized, e.g. by the use of a single screw extruder or a twin-screw extruder which forms strands which may be cut or broken into pellets. The compounder may have a single inlet for introducing the filler/foaming agent and the polymer resin together and any other constituents. Alternatively, separate inlets may be provided for the filler/foaming agent and the polymer resin plus any other necessary constituents or additives. Suitable compounders are available commercially, for example from Coperion (formerly Werner & Pfleiderer). Preferably, the polymer composition in accordance with the present invention is prepared prior to injection moulding.

In accordance with the present invention, the polymer microspheres in the form of pellets (e.g. 980MB120) may be mixed with the host polymer in the form of pellets (e.g. HDPE pellets) e.g. by simple tumble methods at a ratio of about 0.7-16% or 4-10% by weight before being added to the feedstock hopper of an injection moulding machine. By way of example, commercially available 980DU120 from Nouryon would typically need to be pre-compounded into HDPE at about 3-6.5% by weight.

A small amount of mineral oil may be required to compound the polymer microsphere effectively whilst maintaining the processing temperature below the expansion onset temperature of the polymer microspheres. Such formulations typically expand to densities in the range of 30-100 g/L when purged from the end of the injection mould machine extruder barrel at atmospheric pressure.

Methods of Forming the Shaped Article

The shaped article in accordance with the present invention is formed using an injection moulding technique.

Injection moulding is a manufacturing process for producing parts by injecting molten material into a mould. Material for the part is typically fed into a heated container (e.g. a barrel), mixed (typically using a helical shaped screw) and injected or forced into a mould cavity where it cools and hardens to the configuration of the cavity. The mould may be made from metal such as steel or aluminium and precision machined to form the features of the desired part. Injection moulding is ideal for producing high volumes of the same object. Aluminium moulds are less well suited for high volume production or parts with narrow dimensional tolerances as they tend to have inferior mechanical properties and are more prone to wear, damage and deformation during the injection and clamping cycles. However, aluminium moulds are cost effective in low volume applications as mould fabrication costs and time are considerably reduced. Many steels moulds are designed to process well over a million parts during their lifetime though tend to be more expensive.

Typically, injection moulding uses a ram or screw-type plunger to force molten plastic material under high pressure into a mould cavity or tool cavity. This solidifies into a shape that has conformed to the contour of the mould. Injection moulding is suitable for processing both thermoplastic and thermosetting polymers. Thermoplastics are highly suitable for injection moulding such as the ease with which they may be recycled, their versatility allowing them to be used in a wide variety of applications, and their ability to soften and flow upon heating. Moulds may be of a single cavity or multiple cavities.

When thermoplastics are moulded, typically pelletized polymer or polymer composition is fed through a hopper into a heated barrel with a reciprocating screw. Upon entrance to the barrel, the temperature increases and the viscosity is reduced enabling the polymer to flow with the driving force of the injection unit. The screw delivers the raw material forward, mixes and homogenises the thermal and viscous distributions of the polymer, and reduces the required heating time by mechanically shearing the material and adding a significant amount of frictional heating to the polymer. The material feeds forward through a check valve and collects at the front of the screw into a volume known as a shot. A shot is the volume of material that is used to fill the mould cavity and provides a cushion to transfer pressure from the screw to the mould cavity. When enough material has gathered, the material may be forced at high pressure and velocity into the part forming cavity. To prevent spikes in pressure, the process typically uses a transfer position corresponding to a 95-98% by volume full cavity where the screw shifts from a constant velocity to a constant pressure control. Often, injection times are well under one second. Once the screw reaches the transfer position the packing pressure is applied until the gate or cavity entrance solidifies. Due to its small size, the gate is normally the first place to solidify through its entire thickness. Once the gate solidifies, no more material can enter the cavity and accordingly the screw reciprocates and acquires material for the next cycle while the material within the mould cools to a temperature at which the part is dimensionally stable and enough to be ejected from the tool cavity. Once the required temperature has been achieved, the mould opens and an array of pins, sleeves, strippers are driven forward to demould or release the article. Then the mould closes and the process is repeated.

For a so-called over-moulding or multi-shot moulding, two or more separate materials are incorporated into one part. This is achieved by a number of moulding stages in successively bigger tool cavities, each additional shot filling the increased cavity volume over the previous stage and solidifying on the surface of the previously solidified shot. In over-moulding, the solidified part from the first shot is positioned in a new tool as an insert and another shot moulded over it. In multi-shot moulding the part remains in one half of the first tool and a second larger cavity is positioned over it into which the second shot is moulded and so on. This type of injection moulding is useful in providing a product possessing multiple colours or in producing a part with multiple performance characteristics.

Pre-moulded or machined components can be inserted into the cavity while the mould is open, allowing the material injected in the next cycle to form and solidify around them. This process is known as insert moulding and allows single parts to contain multiple materials.

Injection moulding is advantageous over other moulding techniques for a variety of reasons, including a lower cycle time and improved process control.

The polymer entering a mould cavity in an injection moulding process typically freezes instantly on the surface of the tool, as said surface is significantly lower in temperature than the melt temperature of the polymer. The injection pressure continues to shear liquid polymer in the core of the part section across the solidified faces and the additional shear heat partially re-melts the solidified surfaces; creating a boundary layer in equilibrium due to the heat being conducted out through the tool and the additional heat energy being provided by shear. For the production of routine shaped (foamed) polymer articles and for which there may be tolerated a significant variance in the properties across the volume of the polymer this may not be particularly problematic.

However, in connection with the formation of foamed polymers in accordance with the present invention, this mechanism prevents the expansion of voids at the surface of the part being moulded, due to the almost instantaneous freezing of the polymer under high injection pressure which, at least for the case when polymer bubbles are used as the foaming or blowing agent, does not allow sufficient time for void formation.

The present invention addresses this problem by reducing the injection pressure required to form the shaped article.

The barrel temperature of the injection moulding unit may be minimised and preferably is the lower end of the conventional polymer composition processing temperature ($\leq 200°$ C. for HDPE and PP for example). Typically, this allows for additional heat load, for example from shear forces during the injection moulding process and limits the maximum temperature that the foaming agent (e.g. polymer microspheres) is exposed to. For example, for HDPE, suitable barrel temperatures may be about 160-180° C. In order to prevent excessive heating of the melt and shear damage to the polymer microspheres (when present), high shear regions in the melt, for example caused by sharp corners and flow restrictions or non-smooth flow paths, may be reduced, minimised or avoided. Residence time in the barrel may be reduced in order to minimise degradation of the polymer microspheres. Back pressure may be maintained to prevent the pre-expansion of microspheres in the barrel.

The mould cavity or tool cavity is typically evacuated by vacuum pressure before the shot is injected in order to reduce the cavity pressure and to reduce the resistance to foam flow and expansion due to pressure build up from trapped air. Vent plugs made from porous sintered metals, such as those manufactured by Mould and Die Solutions, South Africa or by Viewmold, China or CUMSA may be used. The shot volume may be tuned so that it possesses a volume which is smaller than the volume of the mould cavity in order to allow for expansion of the melt. The volume of the required shot may be calculated by multiplying the part volume with the ratio of required density to compound density. The correct shot volume can also be investigated iteratively by moulding smaller shot volumes until the correct part weight and density is achieved along with adequate mould filling.

For use in the method of the present invention, the injection speed may be reduced when compared with conventional injection moulding and a fill time of about 2 to about 11 seconds may be employed. The fill time may be dependent on the size and shape of the part. The design of the moulding tool may incorporate a hot runner system and hot tip nozzle gate. This ensures that there is no, or minimal, temperature or pressure drop in the material along the injection path before the cavity, thus allowing for lower injection pressures, prevention of the pre-expansion of any polymer microspheres before they enter the cavity, and eliminating cooling and solidification of the polymer melt along the tool surfaces of the sprue before it reaches the cavity.

The method in accordance with the present invention may be carried out by using a movable tool mechanism commonly referred to as a drop tool configuration. A drop tool comprises a part of the tool or mould cavity being movable (typically the movable component is chosen to be the core), whose position relative to the cavity in the injection moulding tool can be adjusted as part of the moulding cycle to change the volume of the cavity. The movement could also come from other parts of the tool; e.g. side action tools or retractable collars and sleeves being other examples. For example, a suitable arrangement comprises one face of a plate shaped cavity which can move relative to the opposite face of said cavity in order to change the section thickness of the cavity.

A shot of known volume (calculated as described above) may be inserted into the cavity with the moveable tool part fully or substantially fully retracted (cavity volume is at a maximum or close to maximum). As the shot is being injected into the low pressure cavity environment (the cavity has a larger volume than the finished part and so the shot does not fully fill the cavity), the foaming or blowing agent will begin to expand and form voids. After injection of the required shot volume, injection pressure is released and the movable tool part is fully or substantially fully extended thereby reducing the cavity volume and forming the cavity shape into the shape required of the shaped article. This extension action forms the expanded mass of the shot into the required shape of the shaped article by compression. This low pressure environment allows for efficient foam formation and the shot volume is chosen in order to provide the required density.

Figure 2:
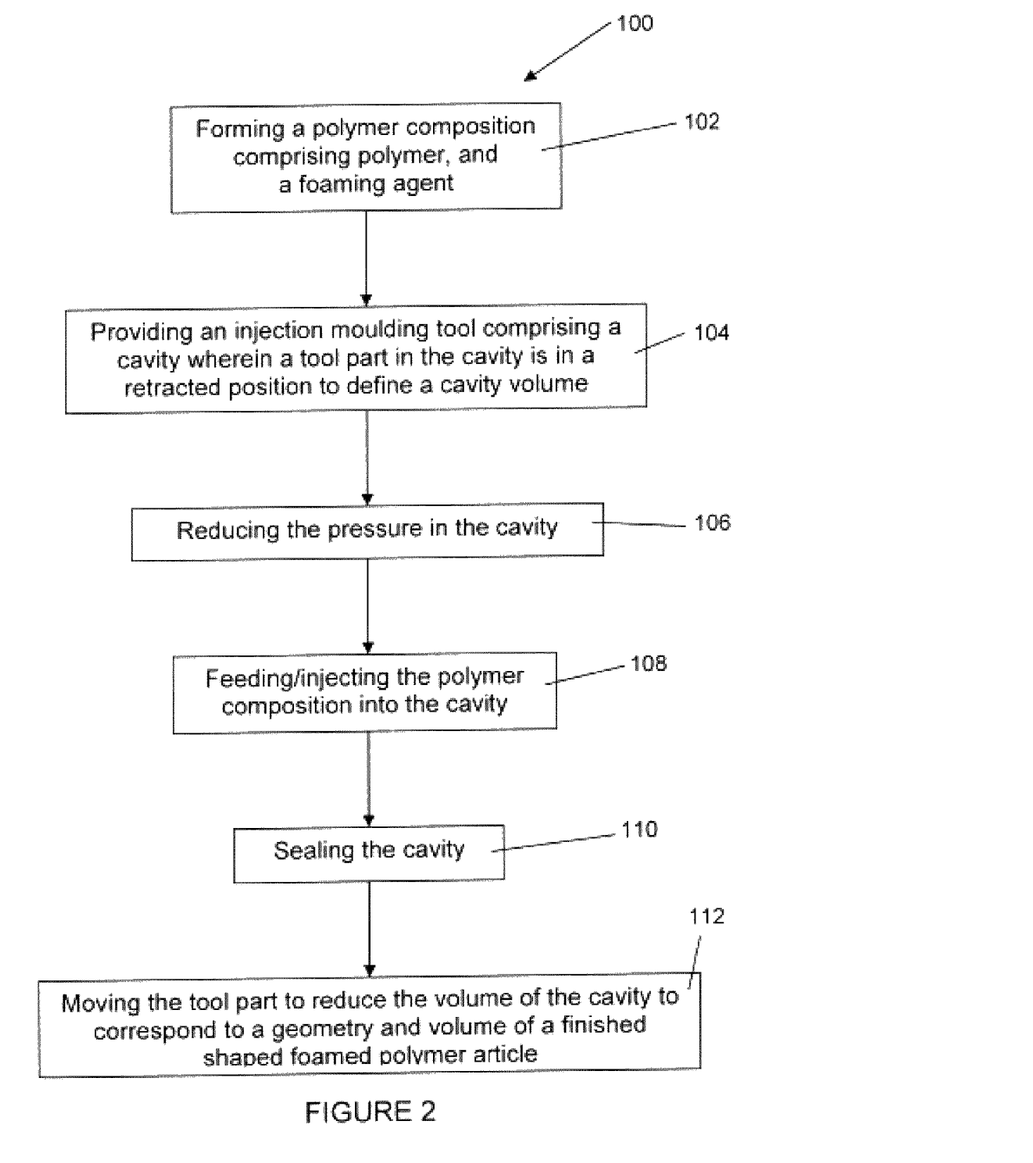
FIG. 2 shows a flow chart depicting one example of preparing a shaped foamed polymer article in accordance with a method of the present invention.

FIG. 2 shows a flow chart of a method (100) of preparing a shaped foamed polymer article according to the present invention. In a first step (102), a polymer composition is formed comprising a polymer, and a foaming or blowing agent, e.g. polymer microspheres. In a second step (104), an injection moulding tool is provided comprising a cavity wherein a tool part in the cavity is retracted to define a cavity volume (preferably in a fully retracted position). In a third step (106), the pressure is reduced in the cavity, preferably using vacuum pressure. In a fourth step (108), the polymer composition is injected into the cavity, preferably at relatively slow speed. In a fifth step (110), the cavity is sealed and in a sixth step (112), the tool part is moved (e.g. extended) to reduce the volume of the cavity to correspond to a geometry and volume of the finished shaped foamed polymer article.

Figure 3:
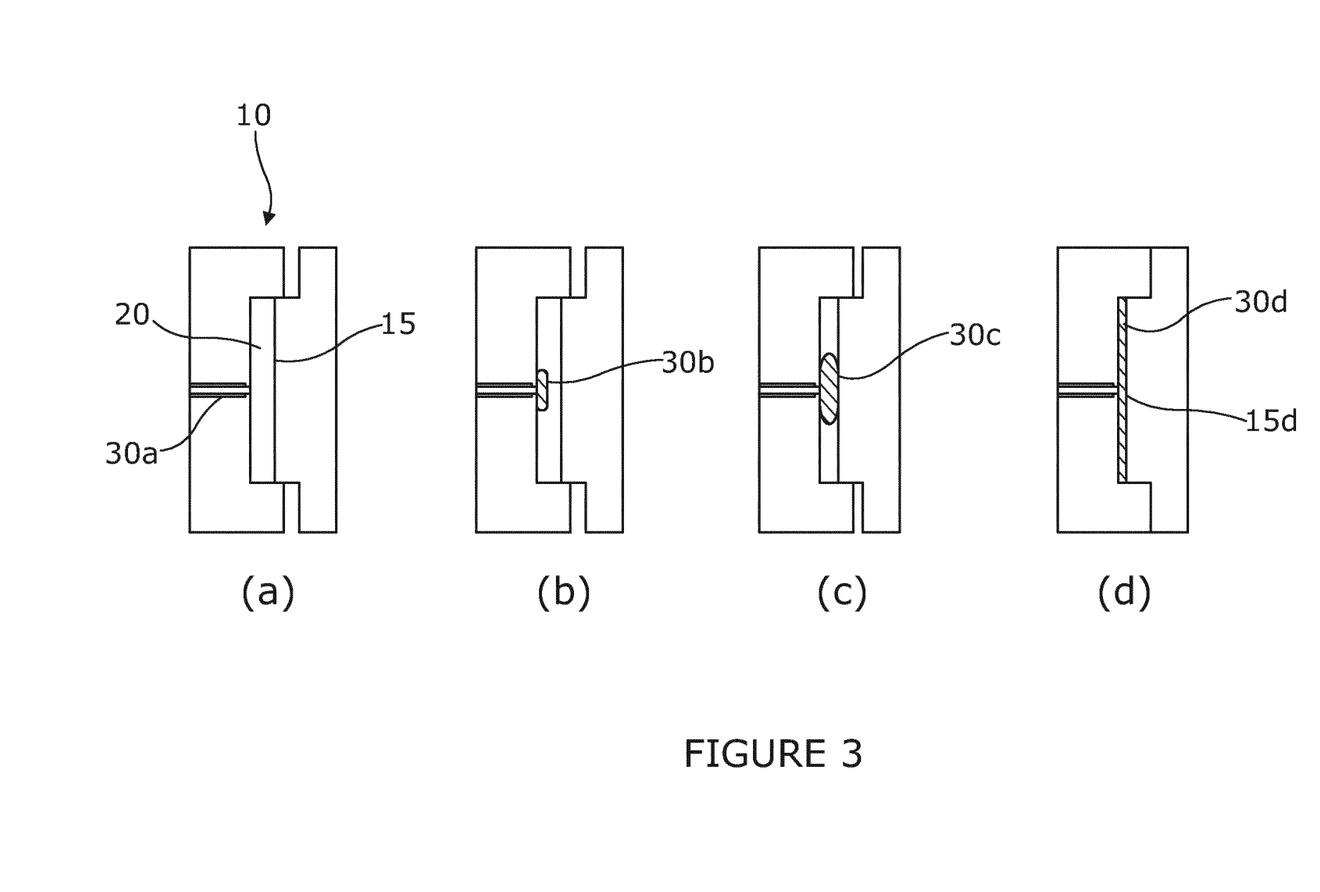
FIGS. 3a-3d shows a method in accordance with the present invention comprising a series of steps where a polymer composition is processed in a tool cavity of an injection moulding tool.

In FIGS. 3a-3d, a sequence of steps is shown illustrating the injection of a polymer composition into a tool cavity of an injection moulding tool in accordance with the present invention. In FIG. 3a, a tool cavity is illustrated generally at (10). The tool cavity (10) possesses a movable tool part, e.g. a movable plate (15). In FIG. 3a, the movable tool part (15) is retracted, either part way or fully to give a cavity volume (indicated at 20) which is greater than that required for the finished part. Polymer composition is indicated at (30a), (30b), (30c), (30d). The polymer composition injected into the tool cavity (10) may be referred to as shot. As the shot is being injected into the low pressure cavity environment as indicated by (30b), the cavity (20) has a larger volume than the finished part and is evacuated under vacuum and so the shot does not fully fill the cavity, the foaming or blowing agent will begin to expand and form voids. After injection of the required shot volume, injection pressure is released (or the gate valve closed) and the movable tool part is fully or substantially fully extended (15d) as shown in FIG. 3d thereby reducing the cavity volume and forming the shot, or polymer composition, into the shape required of the shaped article (30d). This extension action forms the expanded mass of the shot into the required shape of the shaped article by compression. This low pressure environment allows for efficient foam formation and the shot volume is chosen in order to provide the required density. The shaped article is then allowed to cool.

Uses of the Shaped Foamed Polymer Article

The shaped foamed article formed in accordance with the present invention may be used in a range of applications.

Figure 1:
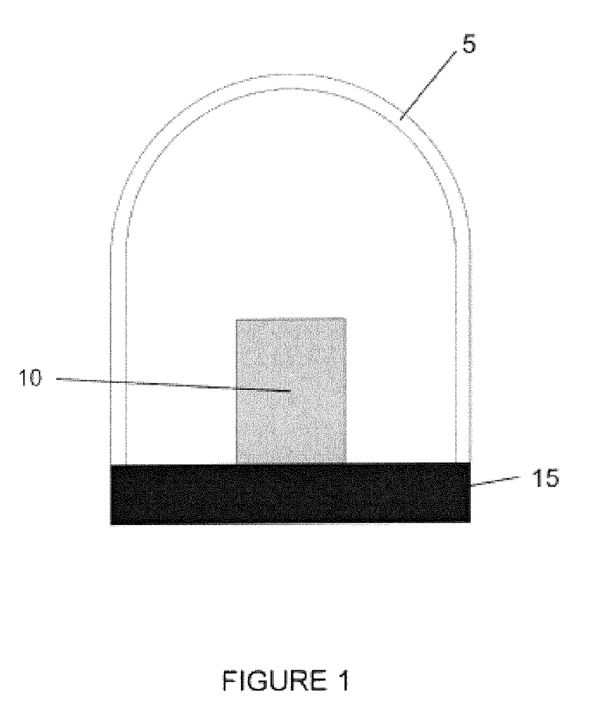
FIG. 1 shows the cross section of a radome structure made from a polymer foam which was made in accordance with the present invention protecting an antenna system.

FIG. 1 is a schematic representation of a radome cross section comprising a polymer foam (5) covering an antenna system (10) which is supported by a housing (15). In FIG. 1, the polymer foam (5) is made in accordance with the present invention and is in the form of providing the function of a radome. A radome is a structure placed over an antenna which protects the antenna from the physical environment outside of the enclosure formed by the radome and its housing. The radome is RF transparent over the operating frequency range of the antenna equipment enclosed within it in order to allow electromagnetic energy to propagate through it in both directions with low levels of signal attenuation. The radome material, i.e. polymer foam (5) may possess an electrical section thickness (the combination of physical thickness and dielectric constant—or permittivity) which is of the order of half a wavelength in order to reduce the resonant absorption of the propagating signal. The present invention provides a low cost, high volume alternative to known techniques.

The polymer foams made in accordance with the present invention may be used in decreasing the weight and raw materials cost of polymer parts, for example thick section polymer parts which may be used for automotive and other mobility applications.

The polymer foams made in accordance with the present invention may be combined with thermoplastic polyurethane(s) or thermoplastic elastomer(s) and optionally other fillers for use in vibro acoustic control products, sound deadening and anti-vibration mounts.

The polymer foams made in accordance with the present invention may be used as insulation materials for use in buildings, the automotive industry, the aerospace industry, and mobility markets such as planes, trains and ships.

The shaped foamed polymer articles formed in accordance with the method of the invention may be suitable for use in a broad range of applications including: electronic or electromechanical sensors, encapsulation of printed circuit boards and electronics, acoustic sound dampening claddings and mounts, thermal insulation, multi-material enclosures and power tool components and pharmaceutical components such as prosthetics and implants.

The shaped foamed polymer articles formed in accordance with the method of the invention may be suitable for use in RF applications such as: RF lenses (e.g. a Luneburg lens), impedance matching layers, encapsulation for antennas, retro-reflectors, RF waveguides, RF filters, RF resonators, metamaterial structures, refraction structures, diffraction structures, or scattering structures.

The person skilled in the art realizes that the present invention is by no means limited to the preferred embodiments described above. On the contrary, many modifications and variations are possible within the scope of the appended claims.

EXAMPLES

Example 1

Figure 4:
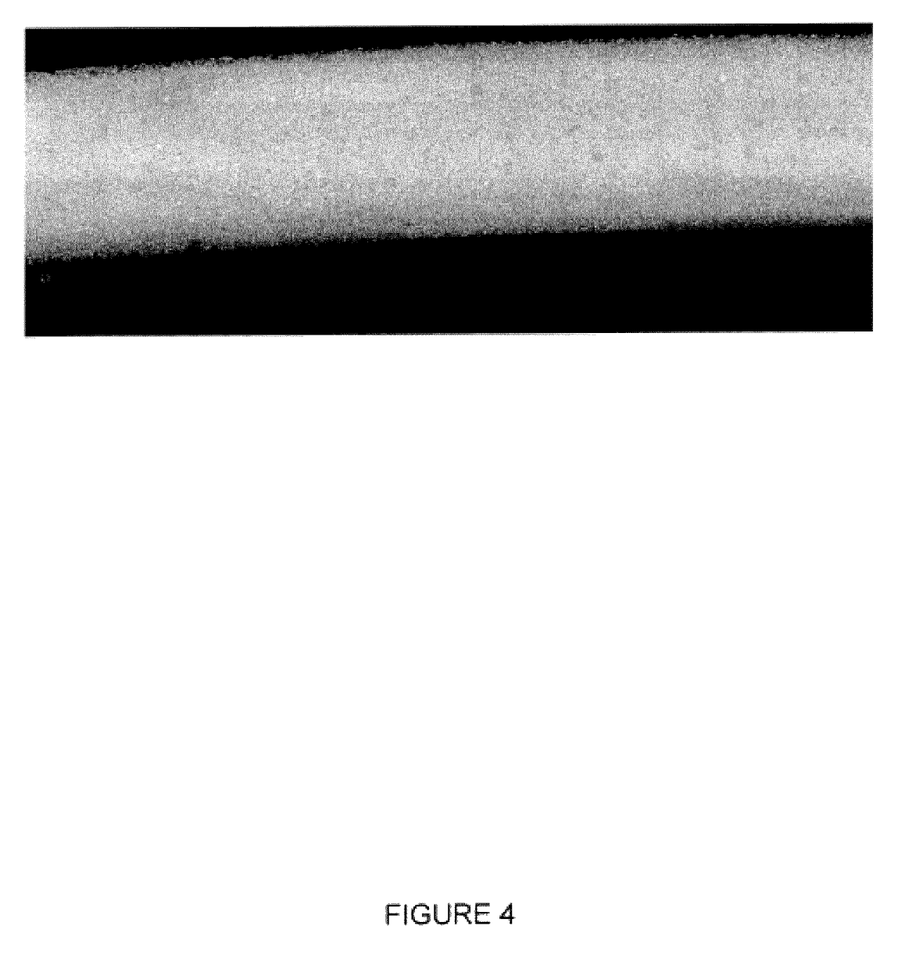
FIG. 4 is a photograph of a sample obtained in accordance with Example 1.

A 130 mm diameter flat disk of approximately 6 mm thickness was manufactured using a formulation of 10% by weight Expancel 980MB120 and 90% weight Dow 25055E HDPE. The parts were moulded on a BOY 80E press using a tool bolster supplied by Meusberger and machined inserts to form the disk cavity. A single nozzle valve gate made by Yudo (product code SAS 32 VV) was chosen to provide a positive shut-off of material flow at the end of the filling phase, the hot runner also maximises channel diameter and minimises sharp corners and restrictions in flow path which could result in high levels of shear. The moving half of the tool featured an adjustable core for the disk providing an adjustable part thickness of between 6 and 20 mm, this also incorporated a Vacuumjet system made by CUMSA (product code VB607638) in the tool to provide evacuation of air from the cavity which allows the Expancel to work to its maximum potential by reducing pressure within the mould. The barrel zone temperatures were set to 170° C. (feed), 160° C. (end zone) and 160° C. (nozzle zone). The hot nozzle was set to a temperature of 180° C. With the core retracted to a position of 15 mm, tool surface temperature 20° C. and a tool closure force of 30 tonnes, a 60 mm shot size (with a Ø42 mm screw this equates to a volume of 83 cm$^3$) was injected at a speed which gave a total injection time of 2 seconds using an available injection pressure of 60 bar. The hot nozzle was then shut off, the moving core was brought forward immediately to compress the molten material to 6 mm. With the valve gate closed the plasticising phase began using a screw speed of 20% RPM with a very low back pressure (which was maintained at 1 bar during barrel re-charging to prevent high shear and damage to the microspheres within the Expancel MB). The part was then allowed to cool for 30 seconds before the tool was opened and the part ejected. A dark field microscope image of a cross section of the parts produced using this process is shown in FIG. 4.

Example 2

Figure 5:
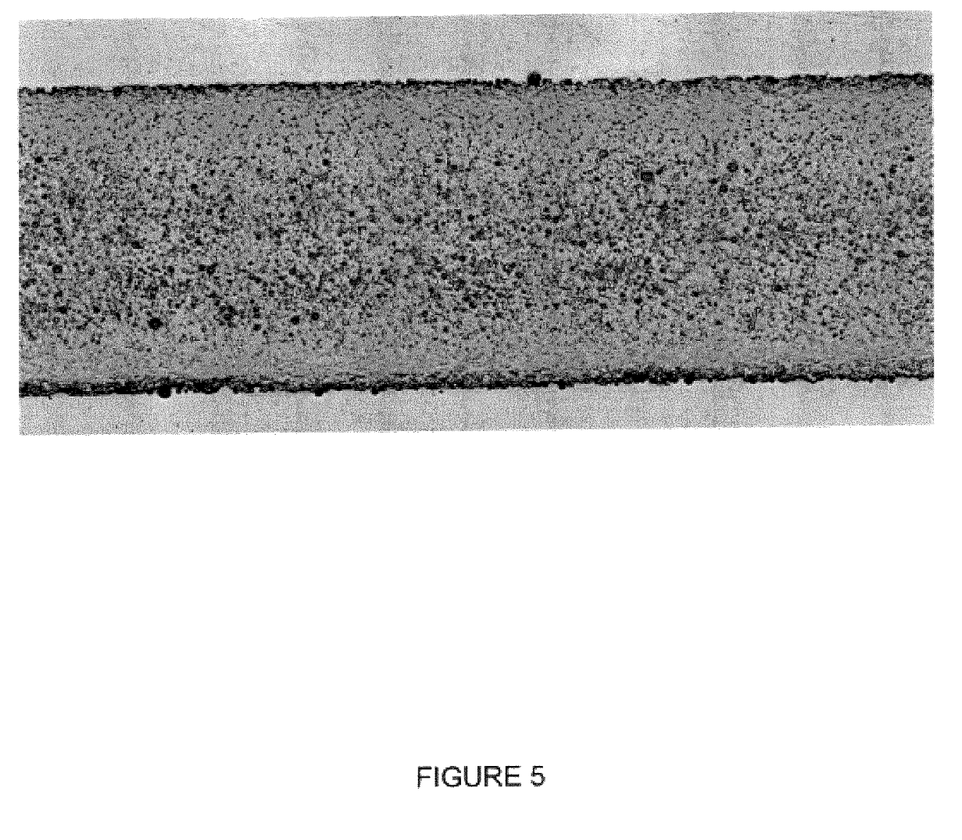
FIG. 5 is a photograph of a sample obtained in accordance with Example 2.

6.5% by weight 980DU120 was compounded into Sabic FPC100 polypropylene copolymer using barrel temperatures of 140° C. and a small amount of mineral oil to allow adequate wetting of the polymer bubbles and pickup into the machine. The same BOY 80E machine was used and the same 130 mm disk tool but a 100 mm long 5 mm diameter sprue replaced the Yudon hot tip nozzle. The core plate was set to 6 mm, the cavity evacuated as for Example 1 and a tool closure force of 15 tonnes was set. The barrel zone temperatures were set to 175° C. (feed), 165° C. (end zone) and 160° C. (nozzle zone) and tool surface temperature 40° C. An 80ml shot was injected at a rate which gave a fill time of 11 seconds. The core plate was not moved and a dwell of 90 seconds employed to allow the part to cool before tool opening and part ejection. The surface of parts made in this way possessed a near solid skin (where very little evidence of void formation can be seen) in the order of 1.0 to 1.5 mm thick. This can be seen in FIG. 5 which shows a similar microscope cross section as that of Example 1.

Example 3

Figure 6:
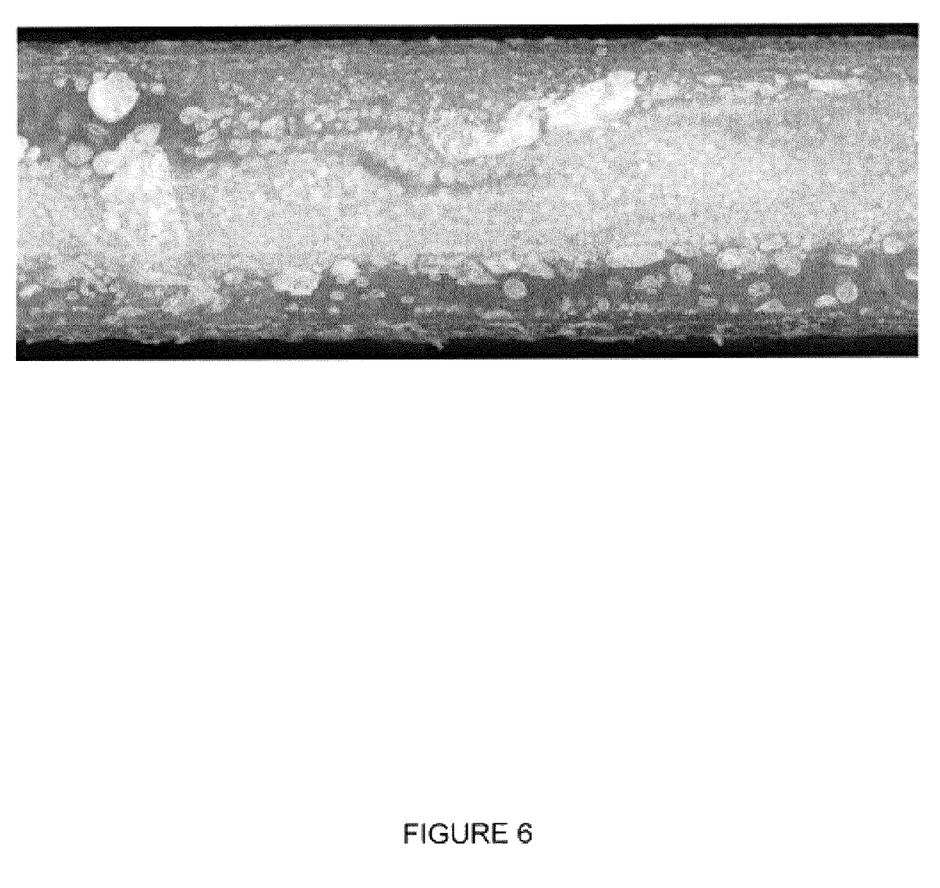
FIG. 6 is a photograph of a sample obtained in accordance with Example 3.

FIG. 6 shows a cross section of a part made using 3% by weight of a conventional azodicarbamide blowing agent in Sabic FPC100 polypropylene copolymer. The homogeneity of the void structure is significantly less than that observed in connection with use of the polymer microspheres as foaming agent.

Additionally, variations to the disclosed embodiments can be understood and effectuated by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage.

The invention claimed is:

1. A method of forming a shaped foamed polymer article in an injection moulding tool from a polymer composition, wherein the injection moulding tool comprises:
   an extruder barrel for receiving the polymer composition; and
   a cavity in which said article is formed;
   wherein the polymer composition comprises a polymer of high-density polyethylene and a foaming agent comprising a polymer shell encapsulating a gas or liquid;
   wherein the foaming agent is present in the polymer composition in an amount of 4-10% by total weight of the polymer composition;
   wherein the method comprises:
   (a) heating the extruder barrel to a temperature of 160-200° C. to aid melting of the polymer composition to form a melted polymer composition prior to its injection into the cavity;
   (b) reducing the pressure in the cavity; and
   (c) injecting the melted polymer composition into the cavity, and wherein the volume of the injected polymer composition is less than the volume of the shaped foamed polymer article in its final form,
   wherein the temperature of the cavity is above a critical onset temperature of the polymer shell, at which the polymer shell softens and expands, and below a maximum expansion temperature of the polymer shell, at which the polymer shell bursts, and
   wherein a shot of the melted polymer composition is injected into the cavity at a reduced injection speed, such that the whole shot is delivered over 2-11 seconds.

2. The method according to claim 1, wherein following (c) the shaped foamed polymer article is cooled.

3. The method according to claim 1, wherein the pressure is reduced in the cavity by evacuating the cavity using vacuum pressure.

4. The method according to claim 3, wherein the vacuum pressure is less than 0.1 bar.

5. The method according to claim 1, wherein the gas is encapsulated and the gas is selected from oxygen, carbon dioxide, nitrogen, or an alkane.

6. The method according to claim 1, wherein the polymer shell is selected from a copolymer or homopolymer of ethylene vinylacetate (EVA), acrylonitrile (ACN), Poly(methyl methacrylate) (PMMA), or Polyvinylidene chloride (PVDC).

7. The method according to claim 1, wherein the permittivity of the shaped foamed polymer article in its final form varies by about 0% to about 2% at any point of the article when compared to any other point on the article.

8. The method according to claim 1, wherein the shaped foamed polymer article is selected from a radome, RF lens, Luneburg lens, impedance matching layer, encapsulation for an antenna, retro-reflector, RF waveguide, RF filter, RF resonator, metamaterial structure, refraction structure, diffraction structure, scattering structure or forms a part thereof.

9. The method according to claim 1, wherein the shaped foamed polymer article is selected from an electronic or electromechanical sensor, encapsulant for printed circuit boards and electronics, acoustic sound dampening cladding and mounts, thermal insulation, multi-material enclosure, power tool component, pharmaceutical components such as prosthetics and implants, or forms a part thereof.

10. A shaped foamed polymer article obtainable from a method in accordance with claim 1.

11. A method according to claim 1, wherein the reduced injection speed is 41.5 cm$^3$/second or less.

12. A method according to claim 1, wherein the shot is injected into the cavity at a reduced injection pressure in the range 1-60 bar.

* * * * *